(12) United States Patent
Tong et al.

(10) Patent No.: US 9,615,309 B2
(45) Date of Patent: Apr. 4, 2017

(54) SYSTEM AND METHOD FOR WI-FI DOWNLINK-UPLINK PROTOCOL DESIGN FOR UPLINK INTERFERENCE ALIGNMENT

(71) Applicant: Huawei Technologies Co., Ltd., Shenzhen (CN)

(72) Inventors: Wen Tong, Ottawa (CA); Jung Hoon Suh, Kanata (CA); Osama Aboul-Magd, Kanata (CA); Kwok Shum Au, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 449 days.

(21) Appl. No.: 13/888,103

(22) Filed: May 6, 2013

(65) Prior Publication Data
US 2014/0328242 A1    Nov. 6, 2014

(51) Int. Cl.
*H04W 72/00*    (2009.01)
*H04W 48/00*    (2009.01)
(Continued)

(52) U.S. Cl.
CPC ....... *H04W 48/00* (2013.01); *H04L 25/03955* (2013.01); *H04B 7/0617* (2013.01);
(Continued)

(58) Field of Classification Search
None
See application file for complete search history.

(56) References Cited

U.S. PATENT DOCUMENTS

| 2007/0206504 A1 | 9/2007 | Koo et al. |
| 2011/0292884 A1 | 12/2011 | Li et al. |

(Continued)

FOREIGN PATENT DOCUMENTS

| EP | 2362580 A2 | 8/2011 |
| WO | 2011136473 A2 | 11/2011 |
| WO | 2014029368 A1 | 2/2014 |

OTHER PUBLICATIONS

International Search Report received in Application No. PCT/CN2014/076572, mailed Aug. 6, 2014, 14 pages.

(Continued)

*Primary Examiner* — Ayaz Sheikh
*Assistant Examiner* — Sori Aga
(74) *Attorney, Agent, or Firm* — Slater Matsil, LLP

(57) ABSTRACT

Embodiments are provided to enable concurrent uplink transmissions from multiple Wi-Fi stations (STAs) to one or more access points (APs) using Interference Alignment (IA). In an embodiment, the STAs broadcast, to one or more APs, beamforming reports including channel estimation information for downlink. The one or more AP then performs channel estimation using the beamforming reports, and selects at least some of the STAs. The AP also computes beamforming information for IA of uplink transmissions between the selected STAs and sends, to the selected STAs, the beamforming information. The beamforming information is piggy-backed over downlink data packets to the selected STAs. Each selected STA then sends an uplink data frame concurrently with one or more other uplink data frames from one or more other selected STAs to the AP. The uplink data frames are configured for concurrent uplink transmissions according to the beamforming information for IA.

25 Claims, 4 Drawing Sheets

(51) Int. Cl.
*H04L 25/03* (2006.01)
*H04L 1/18* (2006.01)
*H04B 7/06* (2006.01)

(52) U.S. Cl.
CPC .............. *H04B 7/0619* (2013.01); *H04L 1/18* (2013.01); *H04W 72/00* (2013.01)

(56) References Cited

U.S. PATENT DOCUMENTS

2013/0203428 A1* 8/2013 Hwang ............... H04W 72/082
 455/450
2015/0016379 A1* 1/2015 Nam ................... H04B 7/0456
 370/329

OTHER PUBLICATIONS

"Draft Standard for Information Technology-Telecommunications and information exchange between systems-Local and metropolitan area networks-Specific requirements: Part 11: Wireless LAN Medium Access Control (MAC) and Phyical Layer (PHY) specification," IEEE P802.11ac/d4.0, Oct. 2012, 408 pgs.
Perahia, E., et al., "Next Generation Wireless LANs" 2008, pp. 94-96.

* cited by examiner

SYSTEM AND METHOD FOR WI-FI DOWNLINK-UPLINK PROTOCOL DESIGN FOR UPLINK INTERFERENCE ALIGNMENT

TECHNICAL FIELD

The present invention relates to the field of wireless communications, and, in particular embodiments, to a system and method for Wi-Fi downlink-uplink protocol design for uplink interference alignment.

BACKGROUND

Wi-Fi is a telecommunications technology that allows an electronic device to exchange data wirelessly (using radio waves) over a computer network, including high-speed Internet connections. The Wi-Fi Alliance defines Wi-Fi as any "wireless local area network (WLAN) products that are based on the Institute of Electrical and Electronics Engineers' (IEEE) 802.11 standards". However, since most modern WLANs are based on these standards, the term "Wi-Fi" can be used in general as a synonym for "WLAN". A device, also referred to as a station, that can use Wi-Fi can connect to a network resource such as the Internet via a wireless network access point (AP). Examples of stations include personal computers (laptops and desktops), video-game consoles, smartphones, computer tablets, and digital audio players. Such an AP (also referred to as hotspot) has a range of about 20 meters indoors and a greater range outdoors.

In Wi-Fi, multiple stations may communicate with a single AP at different times, e.g., one station at a time. The AP sends data to each station via a downlink and receives data from the station via an uplink. Enabling multiple stations to communicate with an AP (or multiple APs) at the same time can improve communications in Wi-Fi, such as to boost the throughput of uplink connection. Thus, there is a need for schemes and protocols to enable communications of multiple STAs to one or more APs concurrently.

SUMMARY OF THE INVENTION

In accordance with an embodiment, a method for enabling concurrent Wi-Fi uplink transmissions from a plurality of stations (STAs) to an access point (AP) includes comprising: receiving, at the AP, beamforming reports from the STAs and performing channel estimation using the beamforming reports. The AP then selects at least some of the STAs according to estimated channel information for downlink, computes beamforming information for interference alignment (IA) of uplink transmissions between the selected STAs, and sends, to the selected STAs, the beamforming information enabling concurrent uplink transmissions from the STAs to the AP.

In accordance with another embodiment, a method for enabling concurrent Wi-Fi uplink transmissions from a plurality of STAs to an AP includes broadcasting, at a STA from the STAs, a beamforming report. The STA then receives, from the AP, beamforming information for IA of uplink transmissions between selected STAs. The received beamforming information is configured according to estimated uplink channels. The STA then sends an uplink data frame concurrently with one or more other uplink data frames from one or more other STAs to the AP. The uplink data frames transmitted on uplink channels are configured for concurrent uplink transmissions according to the beamforming information for IA.

In accordance with another embodiment, a network component supporting concurrent Wi-Fi uplink transmissions from a plurality of STAs to an AP includes a processor and a computer readable storage medium storing programming for execution by the processor. The programming includes instructions to receive, at the AP, beamforming reports including channel estimation information for downlink from the STAs and perform channel estimation using the beamforming reports. The programming further includes instructions to select at least some of the STAs according to estimated channel information, compute beamforming information for IA of uplink transmissions between the selected STAs, and send, to the selected STAs, the beamforming information enabling concurrent uplink transmissions from the STAs to the AP.

In accordance with yet another embodiment, a network component supporting concurrent Wi-Fi uplink transmissions from a plurality of STAs to an AP includes a processor and a computer readable storage medium storing programming for execution by the processor. The programming includes instructions to broadcast, at a STA from the STAs, beamforming reports including channel estimation information for downlink. The programming includes further instructions to receive, from the AP, beamforming information for IA of uplink transmissions between selected STAs. The beamforming information is configured according to the beamforming reports including channel estimation information for downlink. The programming also includes instructions to send an uplink data frame concurrently with one or more other uplink data frames from one or more other STAs to the AP. The uplink data frames transmitted on uplink channels are configured for concurrent uplink transmissions according to the beamforming information for IA.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In current Wi-Fi uplink (UL) transmission from station (STA) to access point (AP), one STA at a time can have an UL access to an AP. To boost the throughput of UL connection, concurrent (or simultaneous) UL transmissions from multiple STAs is needed. Embodiments are provided to enable concurrent UL transmissions from multiple STAs to one or more APs. An Interference Alignment (IA) scheme can be used for concurrent UL transmissions including a new Long Training field (LTF) design for the UL frame format and a new downlink (DL)/UL protocol. The DL/UL protocol adds information on top of DL data transmission using available signaling resources without adding overhead (also referred to herein as piggybacking information on DL data). The piggybacked information indicates a beamforming matrix for selected STAs to transmit UL packets concurrently to one or more APs. The beamforming matrix is used by the selected STAs to achieve the IA for the UL. A DL IA protocol is also used. A null data packet (NDP) during a sounding period can be concurrently broadcasted to STAs to reduce the overhead of DL IA protocol. When concurrent UL transmissions from two STAs is possible, throughput in UL access towards APs is improved. Multiple STAs may have a concurrent UL access to the APs in the same frequency band in a Wi-Fi network, and thus the UL throughput is enhanced.

Figure 1:
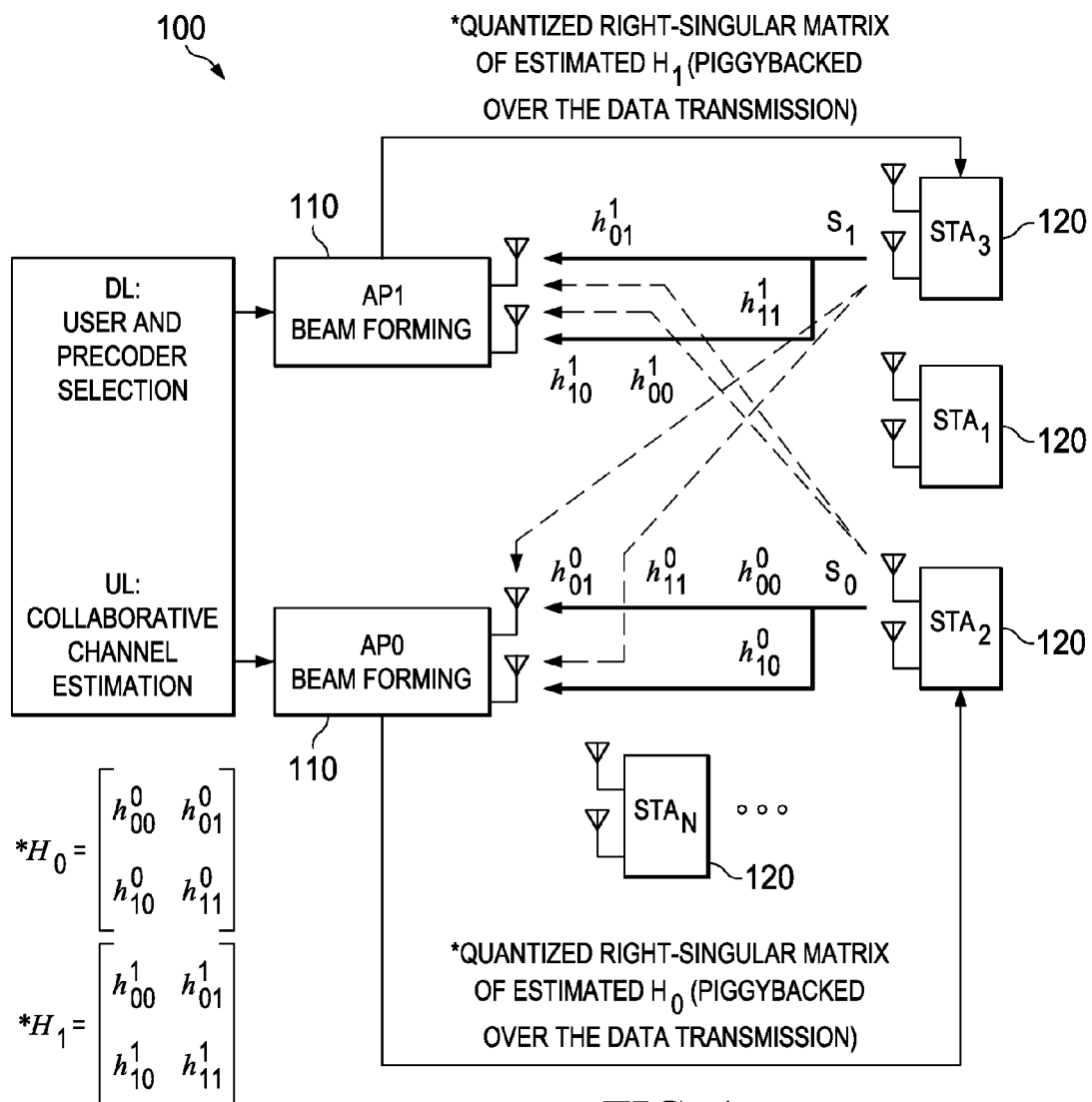
FIG. 1 is an embodiment of a system for concurrent uplink transmissions from multiple stations to one or more access points.

FIG. 1 shows an embodiment of a system 100 for concurrent uplink transmissions from multiple STAs to one or more APs. The system 100 includes a one or more of APs 110 and a plurality of STAs 120. As an example, two APs 110 (AP0 and AP1) and N STAs 120 (STA$_1$, STA$_2$, STA$_3$, . . . , STA$_N$) are shown, where N is an integer indicating the number of STAs 120. The APs 110 are configured to communicate with STAs 120 to select at least some of the STAs for concurrent UL transmissions.

When an IA mode is triggered, each of the AP 110 broadcasts to the STAs 120 a NDP sounding packet for channel feedback, for instance in an alternate manner (each at a time) between the APs 110. The NDP includes a preamble frame comprising a number of LTFs corresponding to a number of transmission streams, e.g., less than or equal to the number of receptions (RX) at each STA 120. During a sounding period for exchanging control information with a NDP packet to setup communications between the APs 110 and the STAs 120, effective channel estimation is done in each STA 120. This information is used for the computation of an average sum-rate per each STA 120 after performing singular value decomposition (SVD) of the estimated effective channels for DL transmission. A SVD operation is performed for the estimated effective channels for DL and a unitary matrix V is produced as a result. The V matrix is quantized and broadcasted back from each STA 120 to the APs 110. An average sum-rate is also computed and sent back to the APs 110.

The beamforming (BF) feedback information (based on the channel estimation for DL) from the STAs 120 to the APs 110 are sent during a BF feedback period that is used for the effective channel estimation for UL transmission. For example, UL channels $h_{00}{}^0$ and $h_{10}{}^0$ are estimated at AP0, and $h_{00}{}^1$ and $h_{10}{}^1$ are estimated at AP1 through the BF report packet sent from STA$_2$, while $h_{01}{}^0$ and $h_{11}{}^0$ are estimated at AP0, and $h_{01}{}^1$ and $h_{11}{}^1$ are estimated at AP1 through the BF report packet sent from STA$_3$. The SVD operation is performed at each AP 110 using the estimated channels for UL, resulting in a V matrix for the UL. The V matrix is piggybacked (using available signaling resources without adding overhead) in a data transmission period on DL to selected STAs 120. For example, AP0 piggybacks the channel information of H$_0$ to STA$_2$, and AP1 piggybacks the channel information of H$_1$ to STA$_3$ on the DL data, in the case STA$_2$ and STA$_3$ are the selected STAs. This piggybacked channel information is used for calculating a beamforming matrix in the selected STAs 120 for concurrent UL.

Figure 2:
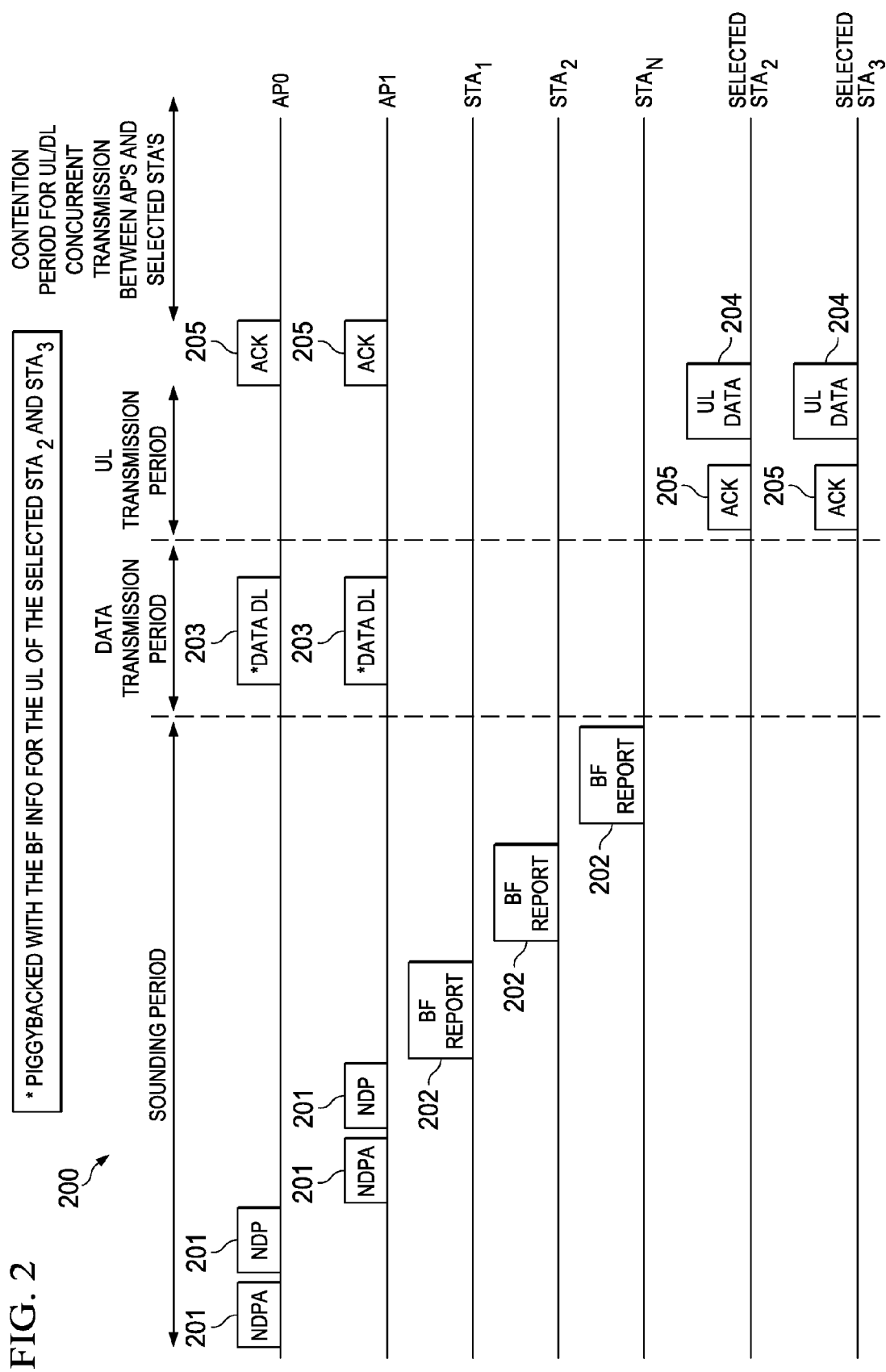
FIG. 2 is an embodiment of a protocol flow for setting up concurrent uplink transmissions from multiple stations to one or more access points.

FIG. 2 shows an embodiment of a protocol flow 200 that can be used in the system 100 for setting up concurrent uplink transmissions from multiple stations to one or more access points. During the sounding period, each AP 110 (e.g., AP0 and AP1) broadcasts, one at a time in order, a NDP frame 201 to the STAs 120. The NDP frame 201 during the sounding period can be designed as described in U.S. Patent Application No. 61/693,103 entitled "System and Method for Interference Alignment in Wi-Fi", filed on Aug. 24, 2012, which is incorporated herein by reference. Subsequently, each STA 120 (e.g., STA$_1$, STA$_2$, STA$_3$, . . . , STA$_N$) sends back, one at a time in order, a BF report or frame 202 which carries the DL channel V matrix and its average sum-rate. The BF report 202 is a broadcasted UL packet from each STA 120 to all involved APs 110.

The BF report or frame 202 is designed as follows. For an UL single stream per STA 120, there is one LTF in the BF report 202. Taking a LTF for a single stream and two transmissions per STA 120 (to two APs 110, AP0 and AP1) as an example, Long Training Sequence (LTS) is mapped from one space-time stream to one LTF (LTF1), e.g., as described in IEEE 802.11ac, using a P matrix as $[LTF1_k]_{N_{TX} \times 1} = Q_k D_{CDD}{}^{(k)} P_{2 \times 1} s_k$, where $$P_{2 \times 1} = \begin{bmatrix} 1 \\ 1 \end{bmatrix},$$

$s_k$ is a LTS in tone k, $Q_k$ is a spatial-mapping matrix between a single stream and $N_{TX}$ transmissions with omni-directional beams, and $D_{CDD}{}^{(k)}$ is a diagonal cyclic-delay diversity (CDD) phase-shift matrix of size 2×2 in tone k, per transmission antenna CDD.

The APs 110, e.g., both AP0 and AP1, that receive the BF report feedback information from all STAs 120, select STAs for concurrent UL transmissions, and compute BF matrix for DL data transmission. The APs 110 also use the BF report feedback information to estimate the effective channels, e.g., H$_0$ and H$_1$ as shown in FIG. 1, for concurrent UL transmissions from the selected STAs 120 (e.g., STA$_2$ and STA$_3$). After performing a SVD of those estimated effective channels, the resulting V matrix (or Eigenvector) is piggybacked over the DL data packets 203. The DL data packets 203 can be transmitted concurrently from the APs 110 on corresponding DL channels to the selected STAs 120. When the amount of data in the DL packets 203 are different (e.g., in size) for different STAs 120, the DL packets 203 can be padded (by adding a padding) to fit the longest packet size. For example, padding is added (e.g., as a string of zeros) in shorter DL packets 203 to fit the length of the longest DL packet 203. Upon receiving the piggybacked V matrix information over the DL data packets 203, the selected STAs 120 may also return ACK messages 205 to the APs 110. The selected STAs 120 send the ACK messages 205 and the UL data concurrently in this proposed scheme.

The UL frames 204 during the concurrent transmissions between the selected STAs 120 is designed as follows. A number of LTFs corresponding to the number of selected STAs 120 for concurrent UL transmissions is needed in each UL frame 204. For example, when there are two selected STAs 120 (STA$_2$ and STA$_3$), and there is a single stream per STA, two LTFs are needed in each UL frame 204. Thus, LTS is mapped from one space-time stream to two LTFs (LTF1, LTF2)), e.g., as described in IEEE 802.11ac, using the P matrix as $[LTF1_k, LTF2_k]_{N_{TX}\times 2} = Q_k D_{CDD}^{(k)} P_{1\times 2} s_k$, where $P_{1\times 2} = [1\ 1]$ for the selected $STA_2$ and $[1\ -1]$ for the selected $STA_3$, and $s_k$ is a LTS in tone k. $Q_k$ is a beamforming matrix, and $D_{CDD}^{(k)}$ is a diagonal CDD phase-shift matrix of size 2×2 in tone k. The first diagonal element is applied for the selected $STA_2$ (e.g., the CDD is applicable only for the selected $STA_2$). The CDD value of the first element is 0.

Since there are two LTFs per UL frame 204, the channel $H_0$ and $H_1$ (as shown in FIG. 1) can be estimated even though the channels are formed concurrently. In this case, a BF is applied per STA, and the channels being estimated are the effective channels, $\tilde{H}_0, \tilde{H}_1$. The minimum mean-square error (MMSE) detection for the concurrent UL transmissions at each AP can be obtained as follows: $\tilde{H}_0 = [\overline{h_0^0 h_1^0}]$ and $\tilde{H}_1 = [\overline{h_0^1 h_1^1}]$. The MMSE detection at AP0, $M_0^H$, and at AP1, $M_1^H$, are $$\left(\tilde{h}_0^0\right)^H \left(\left(\tilde{h}_0^0\right)\left(\tilde{h}_0^0\right)^H + \sigma^2 I + \left(\tilde{h}_1^0\right)\left(\tilde{h}_1^0\right)^H\right)^{-1}$$

and $$\left(\tilde{h}_0^1\right)^H \left(\left(\tilde{h}_0^1\right)\left(\tilde{h}_0^1\right)^H + \sigma^2 I + \left(\tilde{h}_1^1\right)\left(\tilde{h}_1^1\right)^H\right)^{-1}$$

respectively. The received signal vector at each AP0 and AP1 is denoted as $\overline{y_0}$ and $\overline{y_1}$ respectively, where $$\overline{y}_0 = \tilde{H}_0 \bar{s} + \bar{n},\ \overline{y}_1 = \tilde{H}_1 \bar{s} + \bar{n},\ \bar{s} = \begin{bmatrix} s_0 \\ s_1 \end{bmatrix},$$

and $\bar{n}$ is additive white Gaussian noise (AWGN). Thus, $\hat{s}_0 = M_0^H \overline{y}_0$ and $\hat{s}_1 = M_1^H \overline{y}_1$, where $\hat{s}_0$ and $\hat{s}_1$ are the detected $s_0$ and $s_1$ respectively.

Figure 3:
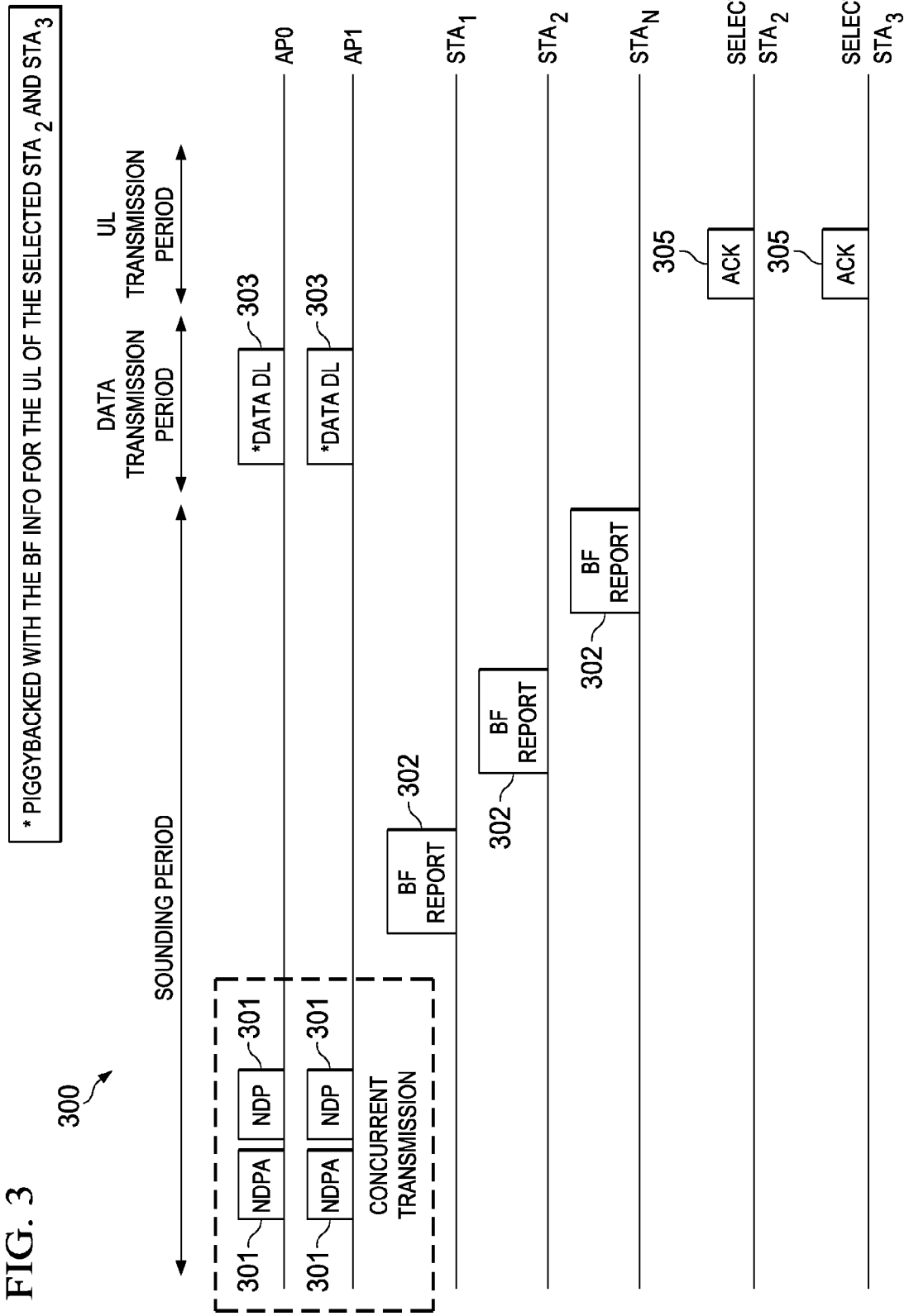
FIG. 3 is another embodiment of a protocol flow for setting up concurrent transmissions of sounding packets broadcasted from multiple access points.

FIG. 3 shows an embodiment of another protocol flow 300 that can be used in the system 100 for setting up concurrent transmissions of NDP sounding packet broadcasted from multiple APs to multiple STAs. The protocol flow 300 exchanges NDP frames 301, BF reports 302, DL data packets 303, ACK messages 305, and UL frames (not shown), similar to the corresponding frames in the protocol flow 200. However, in the protocol flow 300, the NDP frames 301 for channel sounding are transmitted simultaneously from APs. In this case, the preamble of each NDP frame 301 includes 2×N_sts LTFs per AP, where N_sts is the number of Space-Time streams. For example, in the case N_sts is equal to 2 per AP, and the LTF is designed as follows. LTS is mapped from two space-time streams to four LTFs (LTF1, LTF2, LTF3, LTF4), e.g., as described in IEEE 802.11ac, using a P matrix as $[LTF1_k, LTF2_k\ LTF4_k, LTF4_k]_{N_{TX}\times 4} = Q_k D_{CDD}^{(k)} P_{2\times 4} s_k$, where $$P_{2\times 4} = \begin{bmatrix} 1 & -1 & 1 & 1 \\ 1 & 1 & -1 & 1 \end{bmatrix}$$

for AP0 and $$\begin{bmatrix} 1 & 1 & 1 & -1 \\ -1 & 1 & 1 & 1 \end{bmatrix}$$

for AP1, and $s_k$ is a LTS in tone k. $Q_k$ is a spatial mapping matrix between two streams and 4 transmissions, and $D_{CDD}^{(k)}$ is a diagonal CDD phase-shift matrix of size 4×4 in tone k. The first two diagonal elements are applied to AP0 and the last two diagonal elements are applied to AP1. The number of transmissions, $N_{TX}$, is 2×N_sts.

Figure 4:
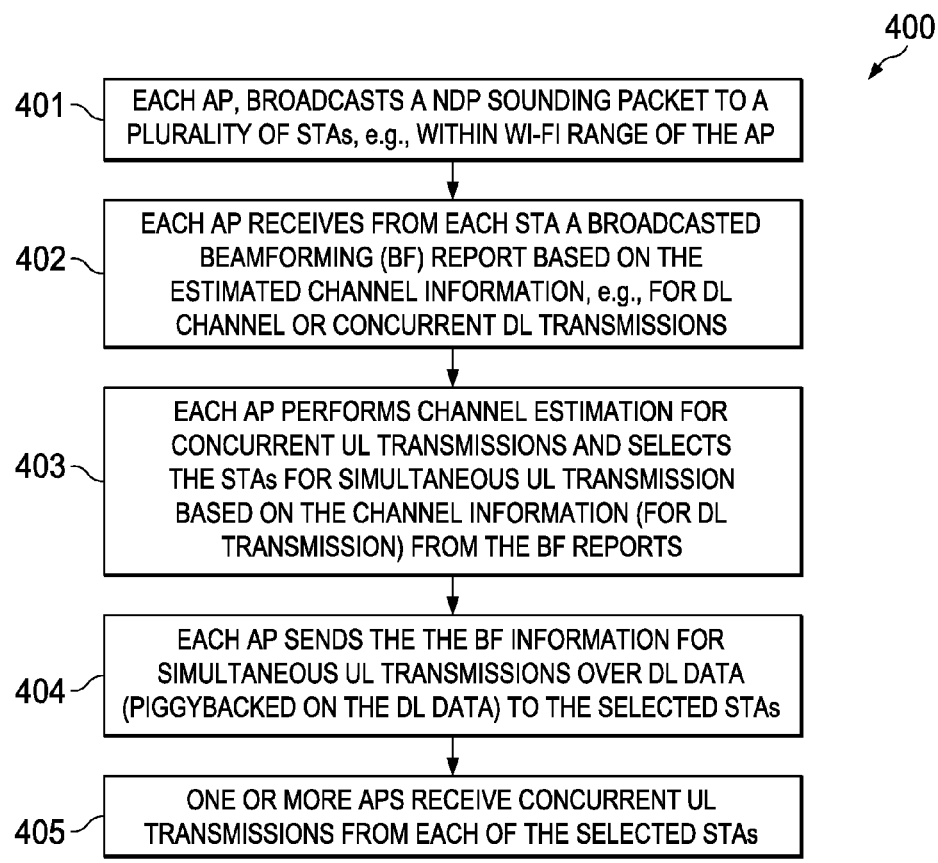
FIG. 4 is a flowchart for an embodiment method for configuring concurrent uplink transmissions from multiple stations to one or more access points.

FIG. 4 shows embodiment method 400 for configuring concurrent uplink transmissions from multiple stations to one or more access points. The method 400 can be implemented by one or more APs for setting up concurrent or simultaneous UL transmissions from multiple selected STAs. At step 401, each AP, broadcasts a NDP sounding frame or packet to a plurality of STAs, e.g., within Wi-Fi range of the AP. The NDP sounding frames can be broadcasted in sequence or order among multiple APs (as in the protocol flow 200) or simultaneously among APs (as in the protocol flow 300). At step 402, each AP receives from each STA a broadcasted BF report based on the estimated channel information, e.g., for DL channel or concurrent DL transmissions. At step 403, each AP performs channel estimation for concurrent UL transmissions and selects the STAs for simultaneous UL transmission based on the channel information (for DL transmission) from the BF reports. At step 404, each AP sends the BF information for simultaneous UL transmissions over DL data (piggybacked on the DL data) to the selected STAs. The DL data may be transmitted concurrently from multiple APs to the selected STAs. At step 405, one or more APs receive concurrent UL transmissions from each of the selected STAs.

Figure 5:
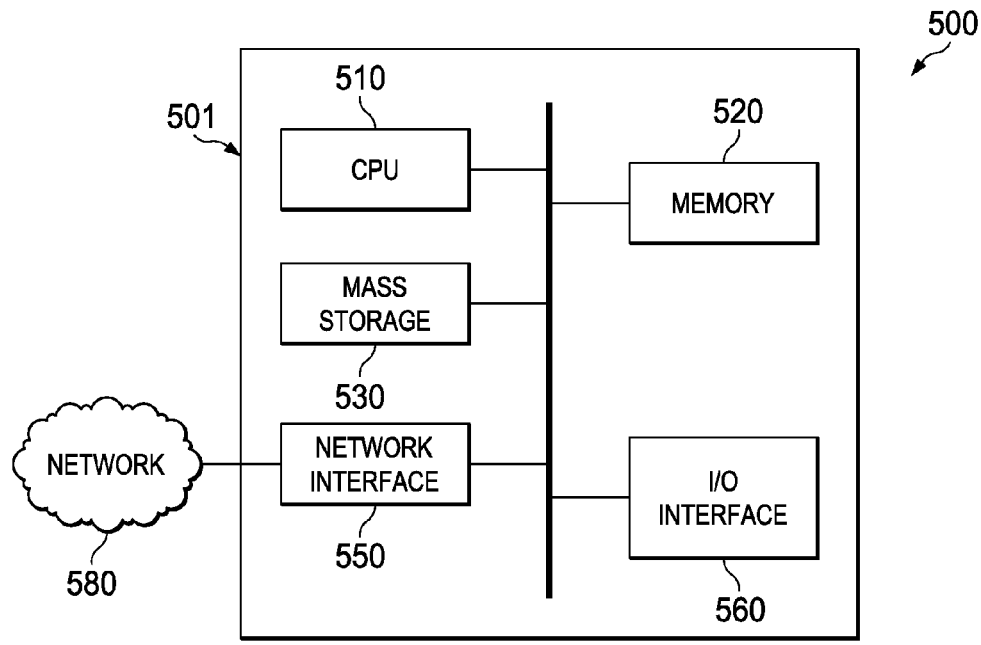
FIG. 5 is a diagram of a processing system that can be used to implement various embodiments.

FIG. 5 is a block diagram of a processing system 500 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a network interfaces, storage interfaces, and the like. The processing unit 501 may include a central processing unit (CPU) 510, a memory 520, a mass storage device 530, and an I/O interface 560 connected to a bus. The bus may be one or more of any type of several bus architectures including a memory bus or memory controller, a peripheral bus or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for enabling concurrent Wi-Fi uplink transmissions from a plurality of stations (STAs) to multiple access points (APs), the method comprising:
   receiving, at one of the multiple APs, beamforming reports from the STAs;
   performing channel estimation using the beamforming reports;
   selecting at least some of the STAs according to estimated channel information for downlink;
   computing beamforming information for interference alignment of concurrent uplink transmissions from the selected STAs to the multiple APs; and
   sending, to the selected STAs, the beamforming information to enable interference alignment of the concurrent uplink transmissions from the selected STAs to the multiple APs, wherein the beamforming information is piggy-backed over downlink data packets using available space within the downlink data packets, and wherein the downlink data packets are transmitted with one or more other downlink data packets from one or more corresponding APs according to an interference alignment scheme for concurrent downlink transmissions from the APs.

2. The method of claim 1, wherein the beamforming reports from the STAs includes estimation channel information for DL transmission, and wherein the channel estimation information for downlink transmission is used for selecting the STAs.

3. The method of claim 1, further comprising:
   broadcasting, at the AP, a null data packet (NDP) in a sounding period to the STAs; and
   receiving the beamforming reports broadcasted from the STAs during the sounding period.

4. The method of claim 3, wherein the beamforming reports are used for estimating uplink channels.

5. The method of claim 3, wherein the NDP is broadcasted by the AP in order and without overlap with one or more other NDPs broadcasted by one or more other APs.

6. The method of claim 3, wherein each of the beamforming reports includes a long training sequence (LTS) mapped from a space-time stream to a long training field (LTF) per tone, and wherein the LTF per tone is generated using a product of a spatial-mapping matrix per tone between a single stream and a number of transmissions per STA, a diagonal cyclic-delay diversity (CDD) phase-shift matrix per tone, a vector of ones, and a LTS tone.

7. The method of claim 3, wherein the downlink data packets include shorter data packets that are padded to match a maximum size of the downlink data packets.

8. The method of claim 3 further comprising receiving concurrently, at the AP, uplink data frames from the selected STAs on corresponding uplink channels, the uplink channels configured for concurrent uplink transmissions according to the beamforming information for interference alignment.

9. The method of claim 8, wherein the uplink data frames are received concurrently with one or more uplink data frames at one or more other APs according to the beamforming information for interference alignment.

10. The method of claim 8, wherein each of the uplink data frames includes a long training sequence (LTS) mapped from a space-time stream to a number of long training fields (LTFs) equal to a product of a number of selected STAs and a number of uplink transmission streams, and wherein the LTFs per tone are generated using a product of a beamforming matrix, a diagonal cyclic-delay diversity (CDD) phase-shift matrix per tone, a row of ones, and a LTS tone.

11. The method of claim 3, wherein the NDP is broadcasted by the AP concurrently with one or more other NDPs broadcasted by one or more corresponding APs according to an interference alignment scheme for concurrent downlink transmissions from the APs.

12. The method of claim 11, wherein the NDP includes a long training sequence (LTS) mapped from a space-time stream to transmission antennas with a same number of long training field (LTF) as a number of transmission space-time stream per AP multiplied by a number of APs concurrently transmitted, and wherein the LTFs per tone are generated using a product of a spatial-mapping matrix per tone between a number of streams and a number of downlink transmissions, a diagonal cyclic-delay diversity (CDD) phase-shift matrix per tone, a matrix of ones, and a LTS tone.

13. A network component supporting concurrent Wi-Fi uplink transmissions from a plurality of stations (STAs) to multiple access points (APs), the network component comprising:
   a processor; and
   a computer readable storage medium storing programming for execution by the processor, the programming including instructions to:
      receive, at one of the multiple APs, beamforming reports including channel estimation information for downlink from the STAs;
      perform channel estimation using the beamforming reports;
      select at least some of the STAs according to estimated channel information;
      compute beamforming information for interference alignment of concurrent uplink transmissions from the selected STAs to the multiple APs; and
      send, to the selected STAs, the beamforming information to enable interference alignment of the concurrent uplink transmissions from the selected STAs to the multiple APs, wherein the beamforming information is piggy-backed over downlink data packets using available space within the downlink data packets, and wherein the downlink data packets are transmitted with one or more other downlink data packets from one or more corresponding APs according to an interference alignment scheme for concurrent downlink transmissions from the APs.

14. The network component of claim 13, wherein the channel estimation information from the STAs includes channel estimation information for downlink transmission, and wherein the beamforming reports including the channel estimation information for downlink is used to obtain the beamforming information for concurrent uplink transmissions.

15. The network component of claim 13, wherein the programming including instructions to:
broadcast, at the AP, a null data packet (NDP) in a sounding period to the STAs;
receive the beamforming reports broadcasted from the STAs during the sounding period; and
receive concurrently, at the AP, uplink data frames from the selected STAs on corresponding uplink channels, the uplink channels configured for concurrent uplink transmissions according to the beamforming information for interference alignment.

16. The network component of claim 15, wherein the beamforming reports are used for estimating uplink channels.

17. The network component of claim 15, wherein the NDP is broadcasted by the AP in order and without overlap with one or more other NDPs broadcasted by one or more other APs.

18. The network component of claim 15, wherein each of the beamforming reports includes a long training sequence (LTS) mapped from a space-time stream to a long training field (LTF) per tone, and wherein the LTF per tone is generated using a product of a spatial-mapping matrix per tone between a single stream and a number of transmissions per STA, a diagonal cyclic-delay diversity (CDD) phase-shift matrix per tone, a vector of ones, and a LTS tone.

19. The network component of claim 15, wherein the downlink data packets include shorter data packets that are padded to match a maximum size of the downlink data packets.

20. The network component of claim 15, wherein the programming further includes instructions to concurrently receive uplink data frames from the selected STAs on corresponding uplink channels, the uplink channels configured for concurrent uplink transmissions according to the beamforming information for interference alignment.

21. The network component of claim 20, wherein the uplink data frames are received concurrently with one or more uplink data frames at one or more other APs according to the beamforming information for interference alignment.

22. The network component of claim 20, wherein each of the uplink data frames includes a long training sequence (LTS) mapped from a space-time stream to a number of long training fields (LTFs) equal to a product of a number of selected STAs and a number of uplink transmission streams, and wherein the LTFs per tone are generated using a product of a beamforming matrix, a diagonal cyclic-delay diversity (CDD) phase-shift matrix per tone, a row of ones, and a LTS tone.

23. The network component of claim 15, wherein the NDP is broadcasted by the AP concurrently with one or more other NDPs broadcasted by one or more corresponding APs according to an interference alignment scheme for concurrent downlink transmissions from the APs.

24. The network component of claim 23, wherein the NDP includes a long training sequence (LTS) mapped from a space-time stream to transmission antennas with a same number of long training field (LTF) as a number of transmission space-time stream per AP multiplied by a number of APs concurrently transmitted, and wherein the LTFs per tone are generated using a product of a spatial-mapping matrix per tone between a number of streams and a number of downlink transmissions, a diagonal cyclic-delay diversity (CDD) phase-shift matrix per tone, a matrix of ones, and a LTS tone.

25. The network component of claim 13, wherein the network component comprises the AP.

* * * * *